(12) United States Patent
Iwasaki

(10) Patent No.: US 11,453,243 B2
(45) Date of Patent: Sep. 27, 2022

(54) TIRE

(71) Applicant: SUMITOMO RUBBER INDUSTRIES, LTD., Hyogo (JP)

(72) Inventor: Satoshi Iwasaki, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 223 days.

(21) Appl. No.: 16/711,502

(22) Filed: Dec. 12, 2019

(65) Prior Publication Data

US 2020/0238764 A1   Jul. 30, 2020

(30) Foreign Application Priority Data

Jan. 25, 2019   (JP) .............................. JP2019-011515

(51) Int. Cl.
*B60C 11/03* (2006.01)
*B60C 11/13* (2006.01)
*B60C 11/11* (2006.01)

(52) U.S. Cl.
CPC ...... *B60C 11/0302* (2013.01); *B60C 11/0309* (2013.01); *B60C 11/11* (2013.01);
(Continued)

(58) Field of Classification Search
CPC . B60C 11/1315; B60C 11/11; B60C 11/1323; B60C 11/0311; B60C 11/0306
See application file for complete search history.

(56) References Cited

U.S. PATENT DOCUMENTS 5,044,414 A * 9/1991 Ushikubo ........... B60C 11/1323
                                                              152/209.24
5,297,604 A    3/1994 Lurois
(Continued)

FOREIGN PATENT DOCUMENTS

EP    0485778 A1    5/1992
JP    H08-169215 A    7/1996
(Continued)

OTHER PUBLICATIONS

Ko, English Machine Translation of KR 20040048215, 2004 (Year: 2004).*

(Continued)

*Primary Examiner* — Robert C Dye
*Assistant Examiner* — Brendon Charles Darby
(74) *Attorney, Agent, or Firm* — Greenblum & Bernstein, P.L.C.

(57) ABSTRACT

A tire comprises a tread portion for which an intended tire rotational direction is specified. The tread portion comprises rows composed of blocks circumferentially divided by lateral grooves. Each block has a ground contacting top surface, and a first side wall surface and a second side wall surface located on a heel-side and a toe-side, respectively, in the intended tire rotational direction. In a cross section of each block which is parallel with the tire circumferential direction, the first and second block-side wall surfaces are both inclined, and the angle θ2 of the second side wall surface is larger than the angle θ1 of the first side wall surface with respect to the tire radial direction. The difference θ2−θ1 between the angles θ2 and θ1 increases toward one side in the tire axial direction.

15 Claims, 4 Drawing Sheets

(52) U.S. Cl.
CPC ...... *B60C 11/1315* (2013.01); *B60C 11/1323* (2013.01); *B60C 2200/14* (2013.01)

(56) References Cited

U.S. PATENT DOCUMENTS

| | | | |
|---|---|---|---|
| 5,679,186 A | 10/1997 | Tagashira et al. | |
| 6,343,636 B1* | 2/2002 | Hanya | B60C 11/1315 |
| | | | 152/209.24 |
| 2006/0037684 A1* | 2/2006 | Vervaet | B60C 11/1315 |
| | | | 152/209.24 |
| 2013/0092304 A1* | 4/2013 | Murata | B60C 11/0306 |
| | | | 152/209.18 |
| 2014/0130952 A1* | 5/2014 | Tanaka | B60C 11/1323 |
| | | | 152/209.24 |

FOREIGN PATENT DOCUMENTS

| | | |
|---|---|---|
| JP | H11-139113 A | 5/1999 |
| KR | 2004048215 A  * | 6/2004 |

OTHER PUBLICATIONS

European Search Report, European Patent Office, Application No. 19215758.4, dated Jun. 9, 2020.

* cited by examiner

TIRE

TECHNICAL FIELD

The present invention relates to a vehicle tire, and more particularly to a tire of which tread portion is provided with blocks.

BACKGROUND ART

Patent Document 1 below discloses a tire of which tread portion is provided with blocks, wherein the heel-side side wall surfaces of the blocks are smaller in the angle with respect to a tire radial-direction than the toe-side side wall surfaces of the blocks.
Patent Document 1: Japanese Patent Application publication No. H08-169215

SUMMARY OF THE INVENTION

Problems to be Solved by the Invention

The tire of Patent Document 1 has a problem such that, when running on rough terrain, mud and soil are easily clogged in lateral grooves which circumferentially divide the blocks, and it is difficult for the tire to continuously exert good traction performance.

In view of the above problems, the present invention was made, and a main objective thereof is to provide a tire capable of continuously exerting good traction performance on rough terrain.

According to the present invention, a tire comprises:
a tread portion for which an intended tire rotational direction is specified,
the tread portion comprises block rows composed of blocks circumferentially divided by lateral grooves and arranged circumferentially of the tire,
the blocks each have a ground contacting top surface, a first side wall surface located on a heel-side in the intended tire rotational direction of the ground contacting top surface, and a second side wall surface located on a toe-side in the intended tire rotational direction of the ground contacting top surface,
the first side wall surface and the second side wall surface are both inclined so that
the distance therebetween measured in parallel with the ground contacting top surface becomes decreased toward the radially outside of the tire, and
in a cross section of each of the blocks which cross section is parallel with the tire equatorial plane,
the angle $\theta 2$ with respect to the tire radial direction of the second side wall surface is larger than
the angle $\theta 1$ with respect to the tire radial direction of the first side wall surface, and
the angle difference $\theta 2-\theta 1$ between the above-said angle $\theta 2$ and the above-said angle $\theta 1$ increases toward one side in the tire axial direction.

The angle difference $\theta 2-\theta 1$ is preferably increased toward the outside in the tire axial direction.

The block rows may include axially outermost shoulder block rows composed of shoulder blocks circumferentially divided by shoulder lateral grooves, and axially inner middle block rows composed of middle blocks circumferentially divided by middle lateral grooves and arranged axially inside the shoulder block rows.

It is preferable that the groove volume of the shoulder lateral grooves is larger than the groove volume of the middle lateral grooves.

As to a maximum value of the above-said angle $\theta 2$ of the second side wall surface, it is preferable that the shoulder blocks are larger than the middle blocks.

As to a maximum value of the angle difference $\theta 2-\theta 1$, it is preferable that the shoulder blocks are larger than the middle blocks.

It is preferable that the shoulder lateral grooves are increased in the groove width toward the adjacent tread edge.

It is preferable for the shoulder blocks that the angle difference $\theta 2-\theta 1$ becomes maximum in the above-said cross section passing through a position at which the width of the shoulder lateral grooves is maximum.

It is preferable that the first side wall surface and a groove bottom surface of the above-said each lateral groove are connected by a first curved surface, and the second side wall surface and the groove bottom surface of the each lateral groove are connected by a second curved surface, and
in the above-said cross section, the radius of curvature $R2$ of the second curved surface is larger than the radius of curvature $R1$ of the first curved surface.

Therefore, in the tire according to the present invention, the second block-side wall surfaces are hardly deformed when the blocks are brought into contact with the ground. Therefore, the volume of the lateral grooves between the blocks is maintained, so it is easy to introduce soil and mud into the lateral grooves when running on rough terrain. On the other hand, the second side wall surface facilitates discharging of the soil and mud in the lateral grooves when the blocks leave the ground. Further, the first side wall surface effectively shears the soil and mud in the lateral grooves and exert high traction.

Further, the angle difference $\theta 2-\theta 1$ is increased toward one side in the tire axial direction. Therefore, the soil and mud in the lateral grooves are more easily discharged during the shearing and the like, and excellent traction performance is continuously exhibited.

DESCRIPTION OF THE PREFERRED EMBODIMENTS

Hereinafter, an embodiment of the present invention will be described in detail with reference to the drawings.

Figure 1:
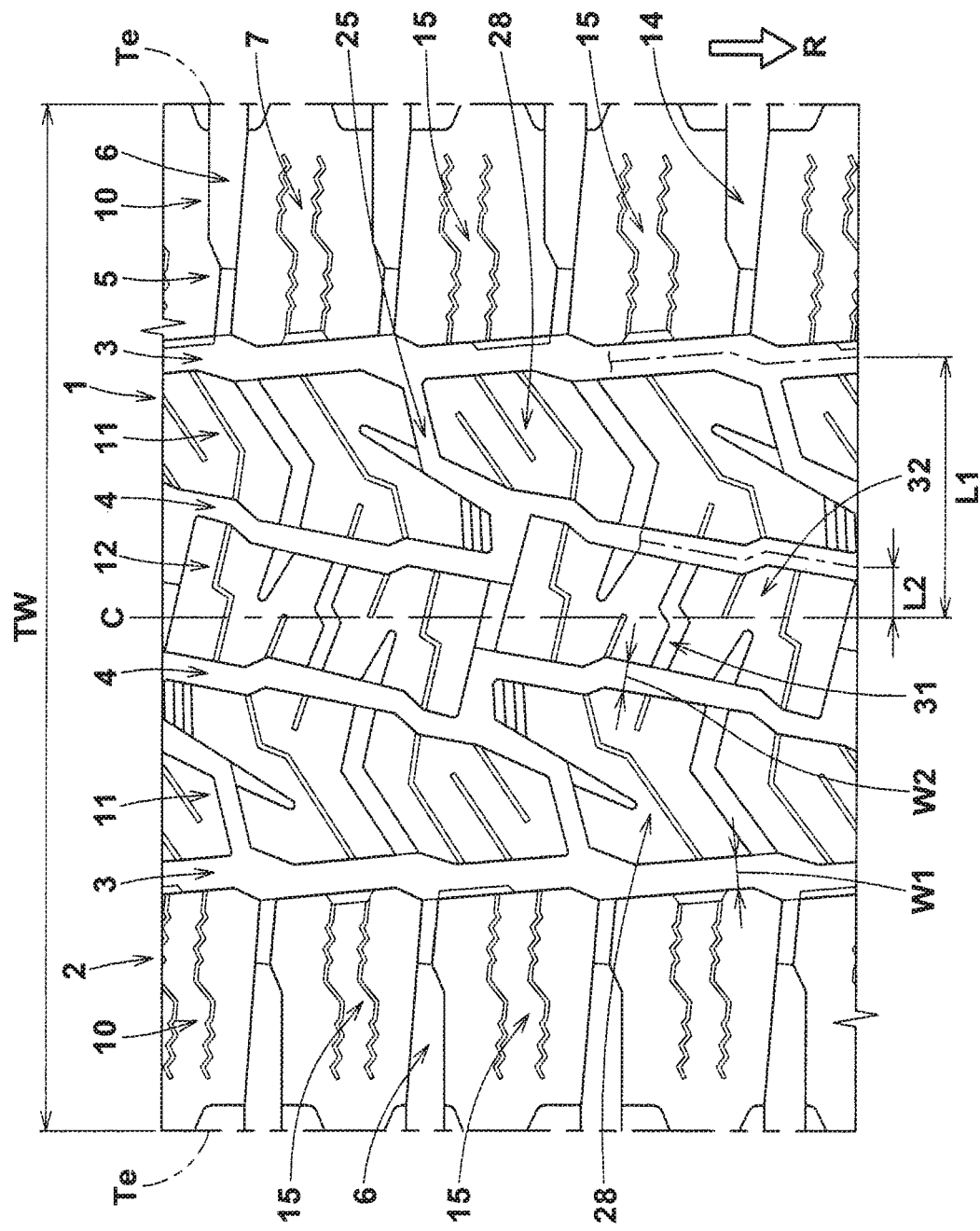
FIG. 1 is a development view of the tread portion of a tire as an embodiment of the present invention.

FIG. 1 is a development view of the tread portion 2 of the tire 1 of the present embodiment.
In the present embodiment, the tire 1 is a pneumatic tire for passenger cars, especially for sport-utility vehicles, suitably used for running off roads and also on mud and snow. However, the present invention can be applied to various tires.

According to the present invention, the tire 1 is unidirectional, namely, it has an intended tire rotational direction R resulting from the structure of the tread portion 2.

For example, the intended tire rotational direction R is indicated in a sidewall portion of the tire by using characters, symbols and the like.

The tread portion 2 is provided with a plurality of main grooves extending continuously in the tire circumferential direction.

In the present embodiment, the main grooves are a pair of axially outermost shoulder main grooves 3 and a pair of axially inner crown main grooves 4 disposed one on each side of the tire equator C.

However, as another embodiment, only one crown main groove 4 may be disposed on the tire equator C.

In the case of a pneumatic tire, the tread edges Te are the axial outermost edges of the ground contacting patch of the tire which occurs under a normally inflated loaded condition when the camber angle of the tire is zero.

The tread-width TW is the width measured under a normally inflated unloaded condition, as the axial distance between the tread edges Te determined as above.

The normally inflated unloaded condition is such that the tire is mounted on a standard wheel rim and inflate to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America). ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

In the present embodiment, the shoulder main grooves 3 and the crown main grooves 4 extend zigzag in the tire circumferential direction.

However, it is not limited to such configurations, and the shoulder main grooves 3 and the crown main grooves 4 may extend linearly, for example.

The distance L1 in the tire axial direction from the tire equator C to the groove center line of each shoulder main groove 3 is, for example, set in a range from 0.20 to 0.30 times the tread-width TW.

The distance L2 in the tire axial direction from the tire equator C to the groove center line of each crown main groove 4 is, for example, set in a range from 0.03 to 0.12 times the tread-width TW.

The groove width w1 of the shoulder main grooves 3 and the groove width w2 of the crown main grooves 4 are preferably set in a range from 2.0% to 5.0% of the tread width TW. The groove depth of the shoulder main grooves 3 and the groove depth of the crown main grooves 4 are preferably set in a range from 8 to 12 mm.

Such main grooves can improve the traction performance on rough terrain without sacrificing the noise performance and steering stability.

The tread portion 2 comprises rows 5 of blocks 7 circumferentially divided by lateral grooves 6 arranged in the tire circumferential direction at intervals (hereinafter the block rows 5).

In the present embodiment, the block rows 5 are a pair of shoulder block rows 10 between the shoulder main grooves 3 and the tread edges Te,
a pair of middle block rows 11 between the shoulder main grooves 3 and the crown main grooves 4, and
a crown block row 12 between the crown main grooves 4.

Taking the shoulder block row 10 shown in FIG. 2 as an example, the configuration of the block 7 will be explained. The shoulder block row 10 is composed of shoulder blocks 15 divided by shoulder lateral grooves 14 as shown in FIG. 2.

Figure 2:
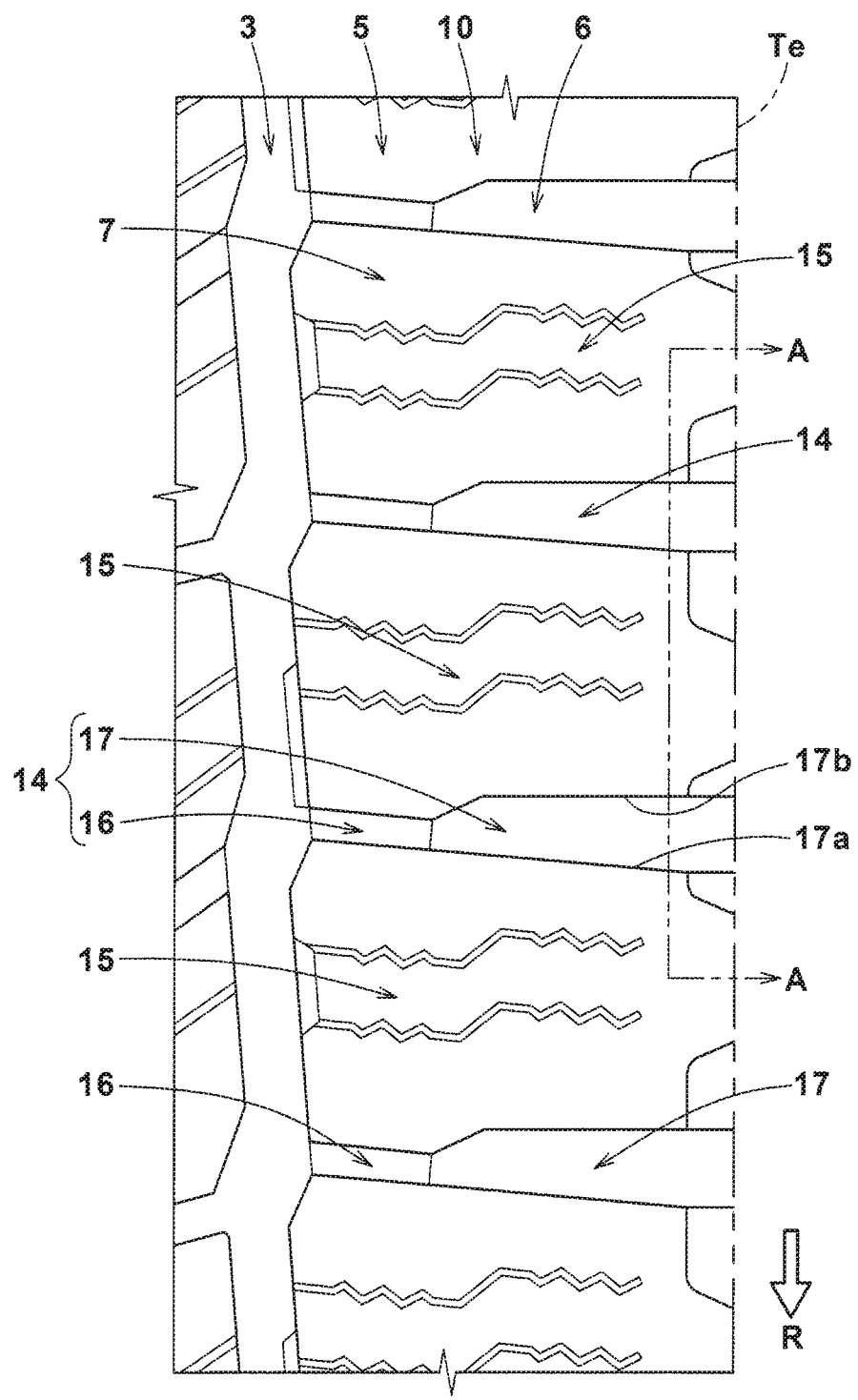
FIG. 2 is an enlarged view of the shoulder block row shown in FIG. 1.
Figure 3:
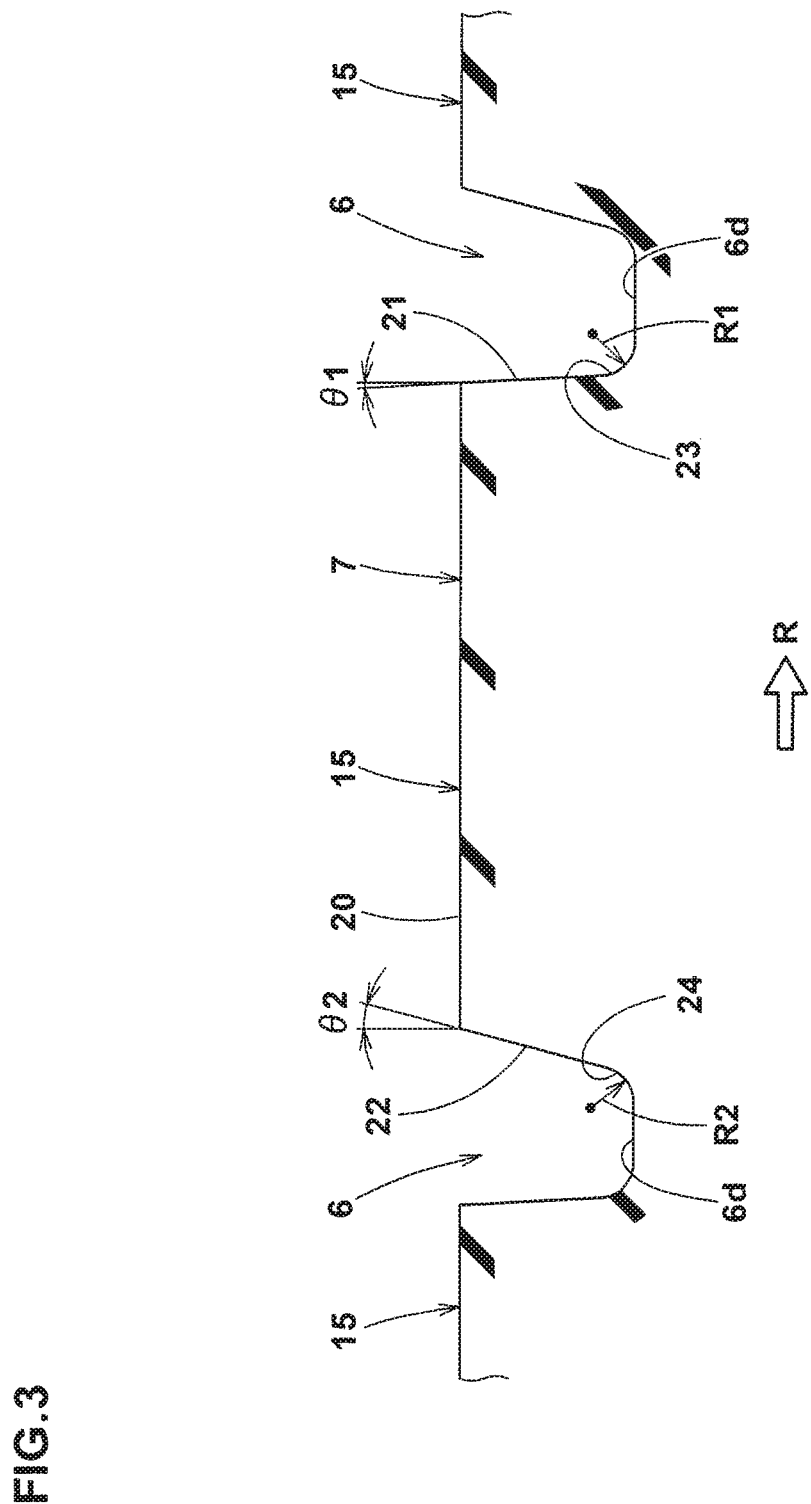
FIG. 3 is a cross sectional view taken along line A-A in FIG. 2.

FIG. 3 is a cross sectional view taken along line A-A of FIG. 2, and shows a cross section of the block 7 in parallel with the tire circumferential direction or the tire equatorial plane.

As shown in FIG. 3, each of the blocks 7 has a ground contacting top surface 20,
a first side wall surface 21 located on the heel-side in the intended tire rotational direction R of the ground contacting top surface 20, and
a second side wall surface 22 located on the toe-side in the intended tire rotational direction R of the ground contacting top surface 20.

The first side wall surface 21 and the second side wall surface 22 are each inclined to the other toward the radially outside so that the distance in the tire circumferential direction between these surfaces 21 and 22 measured in parallel with the ground contacting top surface 20 becomes smaller toward the outside in the tire radial direction.

In any cross section of each block 7 parallel to the tire equatorial plane, the second side wall surface 22 has an angle $\theta 2$ with respect to the tire radial direction, and the first side wall surface 21 has an angle $\theta 1$ with respect to the tire radial direction, wherein the angle $\theta 2$ is larger than the angle $\theta 1$.

In FIG. 3, the angle difference $\theta 2 - \theta 1$ between the angle $\theta 2$ and the angle $\theta 1$ is shown with exaggeration so that the invention can be easily understood.

Therefore, in the tire according to the present invention, the second side wall surface 22 is hardly deformed when the blocks 7 are brought into contact with the ground.
As a result, the volume of the lateral grooves 6 between the blocks is maintained, so soil and mud are easily introduced into the lateral grooves 6 when running on rough terrain. However, the second side wall surface 22 makes it easy to discharge soil and mud in the lateral grooves 6 when the blocks 7 leave the ground.
Further, the first block-side wall surfaces 21 effectively shear the soil and mud in the lateral grooves 6 and exert high traction.

In the present invention, the angle difference $\theta 2 - \theta 1$ between said angle $\theta 2$ and said angle $\theta 1$ increases toward one side in the tire axial direction. As a result, the soil and mud in the lateral grooves 6 are pushed away in the tire axial direction during the shearing, and the soil and mud are easily discharged, therefore, it is possible to continuously exert the excellent traction performance.

Moreover, since the tire of the present invention is improved in the traction performance without increasing the volume of the lateral grooves, the noise performance and the steering stability can be maintained.

In the present embodiment, it is desirable that the angle difference θ2−θ1 increases toward the outside in the tire axial direction so that soil and mud are more easily discharged from the lateral grooves 6.

In the above-said cross section passing through the center in the tire axial direction of each block 7, the angle θ1 is preferably 2 to 8 degrees, more preferably 4 to 6 degrees, and the angle θ2 is preferably 3 to 15 degrees, more preferably 6 to 12 degrees.

Thereby, the noise performance, the steering stability and the traction performance on rough terrain can be improved in a balanced manner.

From the same point of view, the angle difference θ2−θ1 in the entire lateral grooves 6 is preferably set in a range of 3 to 10 degrees, for example.

In the present embodiment, with respect to the first side wall surface 21 and the second side wall surface 22 which are adjacent to each lateral groove 6,
the angle θ1 of the first side wall surface 21 is constant in the length direction of the lateral groove 6, and
the angle θ2 of the second side wall surface 22 is changed in the length direction of the lateral groove 6.
Thereby, the first side wall surface 21 can hold and shear mud and soil, and a large traction can be obtained.

The first side wall surface 21 is connected to the groove bottom surface 6d of the adjacent lateral groove 6 through a first curved surface 23.
The second side wall surface 22 is connected to the groove bottom surface 6d of the adjacent lateral groove 6 through a second curved surface 24.
The radius of curvature R2 of the second curved surface 24 is preferably larger than the radius of curvature R1 of the first curved surface 23 in the above-said cross sections of the respective blocks 7.
As a result, the second side wall surface 22 becomes more difficult to deform and the steering stability can be improved. In order to enhance this effect, the radius of curvature R1 is preferably in a range from 1.0 to 3.0 mm, and the radius of curvature R2 is preferably in a range from 1.0 to 5.0 mm, for example.

In this embodiment, as shown in FIG. 2, the groove width of each shoulder lateral groove 14 increases toward the adjacent tread edge Te.

It is preferable for each shoulder block 15 that the angle difference θ2−θ1 in the above-said cross section becomes maximum at a position at which the groove width of the shoulder lateral groove 14 is maximum.
Such shoulder blocks 15 make it easier to discharge the soil and mud in the shoulder lateral grooves 14.

In the present embodiment, the shoulder lateral groove 14 comprises an axially inner first portion 16 of which axially inner end is connected to the shoulder main groove 3, and an axially outer second portion 17 of which axially inner end is connected to the axially outer end of the first portion 16. The first portion 16 has a constant groove width along its length. The second portion 17 has a variable groove width gradually increasing toward the adjacent tread edge Te.
Such shoulder lateral grooves 14 help to improve the traction performance on rough terrain while maintaining the steering stability.

Ft is preferable that the groove depth of the first portion 16 is smaller than the groove depth of the second portion 17 in order to exert excellent steering stability.

In the present embodiment, the second portion 17 has a first groove edge 17a extending straight from the first portion 16, and a second groove edge 17b extending from the first portion 16 in a bent manner such that the groove width increases toward the adjacent tread edge Te.

Figure 4:
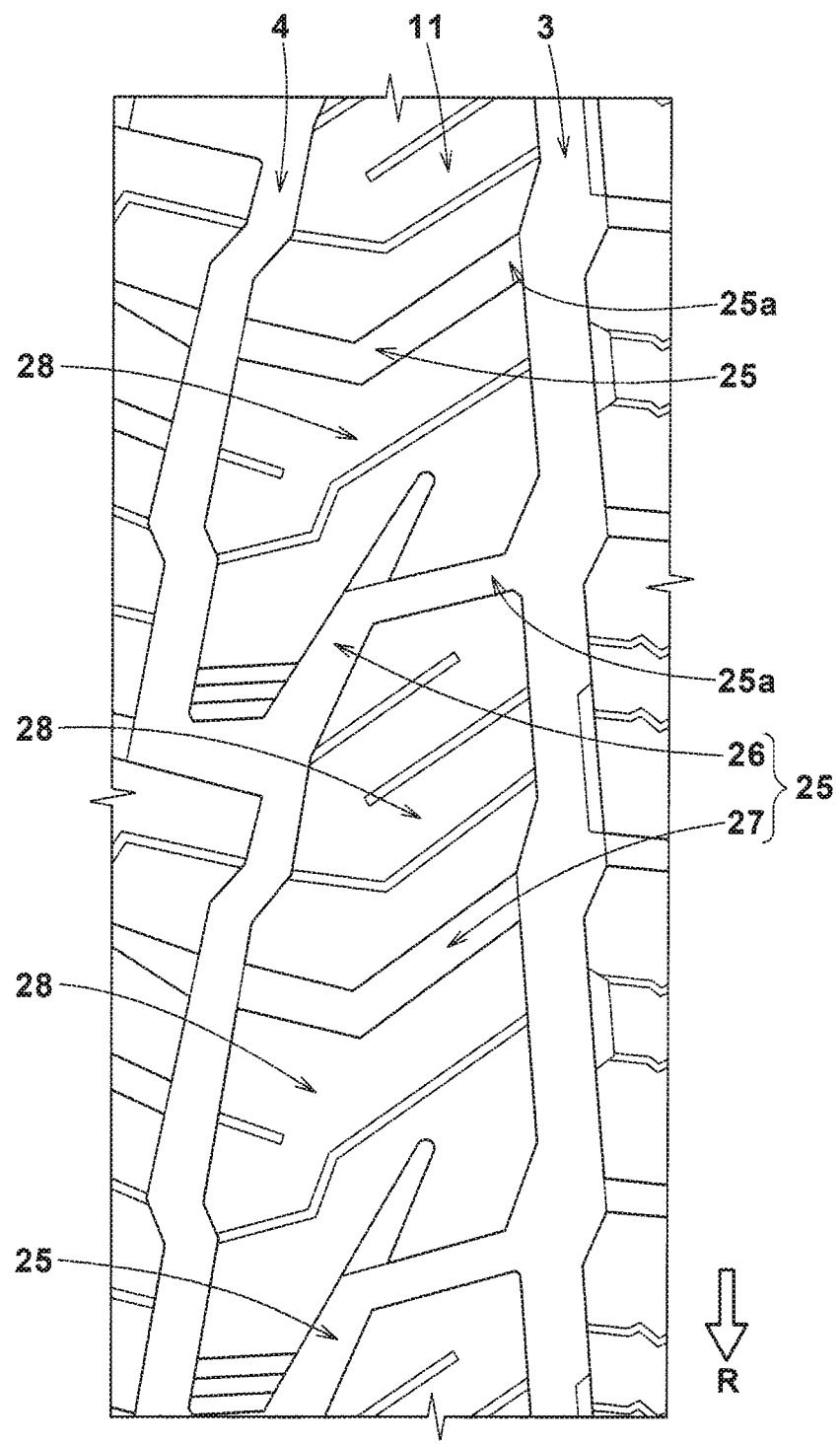
FIG. 4 is an enlarged view of the middle block row shown in FIG. 1.

It is preferable that, with respect to the tire axial direction, the shoulder lateral grooves 14 are inclined at an angle of less than 10 degrees, FIG. 4 shows the middle block rows 11. As shown, the middle block rows is composed of a plurality of middle blocks 28 circumferentially divided by middle lateral grooves 25.
Each of the middle blocks 28 has the first side wall surface 21 and the second side wall surface 22 as described above, and the middle block rows 11 can exert the above-described effects as well.

In this embodiment, the groove volume of the shoulder lateral grooves 14 is larger than the groove volume of the middle lateral grooves 25.
Further, the shoulder blocks 15 are larger than the middle blocks 28 with respect to the maximum value of the angle θ2. Preferably, the shoulder blocks 15 are larger than the middle blocks 28 with respect to the maximum value of the angle difference θ2−θ1.
Thereby, the rigidity of the middle block rows 11 is maintained, and excellent steering stability can be exhibited.

It is preferable that the middle lateral grooves 25 comprise a portion 25a connected to the shoulder main groove 3 and inclined in the direction opposite to the shoulder lateral grooves 14. Such middle lateral grooves 25 can provide a large reaction force in a different direction than that from the shoulder lateral grooves 14 when running on rough terrain.

In the present embodiment, the middle lateral grooves 25 include a first middle lateral groove 26 bent convexly toward one side in the tire circumferential direction, and a second middle lateral grooves 27 bent convexly toward the other side in the tire circumferential direction.
The groove width of the first middle lateral groove 26 increases toward the tire equator C. The groove width of the second middle lateral groove 27 is constant along its length direction. The first middle lateral grooves 26 and the second middle lateral grooves 27 can suppress the generation of pumping sound, and can make the pumping sound white noise, therefore, excellent noise performance can be obtained.

As shown in FIG. 1, the crown block row 12 is composed of a plurality of crown blocks 32 circumferentially divided by crown lateral grooves 31.
The crown blocks 32 each have the first side wall surface 21 and the second side wall surface 22 as described above, and the crown block rows 12 can exert the above-described effects as well.

While detailed description has been made of an especially preferable embodiment of the present invention, the present invention can be embodied in various forms without being limited to the illustrated embodiment.

Working Examples

Test tires of size 225/65R17 (rim size 17×6.5J) having the tread pattern shown in FIG. 1 were experimentally manufactured and tested for the traction performance on rough terrain. All the test tires had the same structure except for the specifications shown in Table 1.
In Table 1, the values of the angle θ1 and angle θ2 are those measured at the center in the tire axial direction of the shoulder blocks. The range of value of the angle difference $\theta2-\theta1$ is that over the entire length of the respective lateral grooves.

<Traction Performance on Rough Terrain>
Using a 2000 cc 4WD vehicle of which all wheels were provided with the same test tires inflated to 220 kPa, the traction performance and its sustainability of the test vehicle were evaluated by the test driver when running on rough terrain. The test results are indicated in Table 1 by an index based on comparative example 1 being 100, wherein the larger value indicates that the traction performance in rough terrain was exerted more uninterruptedly.

TABLE 1

| Tire | comparative example 1 | comparative example 2 | working example 1 | working example 2 |
|---|---|---|---|---|
| angle $\theta1$ of first side wall surface (deg.) | 8 | 5 | 5 | 2 |
| angle $\theta2$ of second side wall surface (deg.) | 8 | 8 | 11 | 3 |
| angle difference $\theta2-\theta1$ (deg.) | 0 (constant) | 3 (constant) | 4 to 8 | 1 to 3 |
| traction performance on rough terrain | 100 | 102 | 108 | 105 |

| Tire | working example 3 | working example 4 | working example 5 | working example 6 |
|---|---|---|---|---|
| angle $\theta1$ of first side wall surface (deg.) | 4 | 5 | 6 | 8 |
| angle $\theta2$ of second side wall surface (deg.) | 6 | 8 | 12 | 15 |
| angle difference $\theta2-\theta1$ (deg.) | 1 to 4 | 1 to 5 | 4 to 8 | 6 to 10 |
| traction performance on rough terrain | 107 | 107 | 108 | 108 |

From the test results, it was confirmed that according to the present invention, the tires can continuously exert good traction performance on rough terrain.

DESCRIPTION OF THE REFERENCE SIGNS 2 tread portion
5 block row
6 lateral groove
7 block
20 ground contacting top surface
21 first side wall surface
22 second side wall surface
R intended tire rotational direction
$\theta1$ angle
$\theta2$ angle

The invention claimed is:
1. A tire comprising:
a tread portion for which an intended tire rotational direction is specified,
the tread portion comprises block rows composed of blocks circumferentially divided by lateral grooves and arranged circumferentially of the tire,
the blocks each have a ground contacting top surface, a first side wall surface located on a heel-side in the intended tire rotational direction of the ground contacting top surface, and a second side wall surface located on a toe-side in the intended tire rotational direction of the ground contacting top surface,
the first side wall surface and the second side wall surface are both inclined so that a distance therebetween measured in parallel with the ground contacting top surface becomes decreased toward a radially outside of the tire, and
in a cross section of each of the blocks which is parallel with a tire equatorial plane, an angle $\theta2$ with respect to a tire radial direction of the second side wall surface is larger than an angle $\theta1$ with respect to a tire radial direction of the first side wall surface, and
an angle difference $\theta2-\theta1$ between said angle $\theta2$ and said angle $\theta1$ increases toward one side in a tire axial direction, and said angle $\theta1$ of the first side wall surface is constant along a length of a respective lateral groove formed between the first and second side wall surfaces in the tire axial direction,
wherein
the blocks include shoulder blocks,
the block rows include a pair of axially outermost shoulder block rows each composed of the shoulder blocks circumferentially divided by shoulder lateral grooves,
each of the shoulder lateral grooves comprises
an axially inner first portion of which axially inner end is connected to a shoulder main groove extending circumferentially of the tire, and
an axially outer second portion of which axially inner end is connected to an axially outer end of the axially inner first portion,
the axially inner first portion has a constant groove width along its length,
the axially outer second portion has a variable groove width gradually increasing toward an adjacent tread edge, wherein the axially outer second portion has a first groove edge extending straight from the first portion in a top view of the shoulder lateral groove, and a second groove edge extending from the first portion in a bent manner in the top view of the shoulder lateral groove so as to have said variable groove width,
wherein
the blocks further include middle blocks, and
the block rows further include a pair of axially inner middle block rows each composed of the middle blocks circumferentially divided by middle lateral grooves and arranged between the shoulder block rows,
wherein
the middle lateral grooves in each of the axially inner middle block rows include
first middle lateral grooves bent convexly toward one side in a tire circumferential direction, and
second middle lateral grooves bent convexly toward the other side in the tire circumferential direction.
2. The tire according to claim 1, wherein the angle difference $\theta2-\theta1$ is increased toward an outside in the tire axial direction.

3. The tire according to claim 2, wherein
a groove volume of the shoulder lateral grooves is larger than a groove volume of the middle lateral grooves.

4. The tire according to claim 3, wherein
a maximum value of the angle difference θ2-θ1 of each of the shoulder blocks is larger than a maximum value of the angle difference θ2-θ1 of each of the middle blocks.

5. The tire according to claim 2, wherein
a maximum value of the angle difference θ2-θ1 of each of the shoulder blocks is larger than a maximum value of the angle difference θ2-θ1 of each of the middle blocks.

6. The tire according to claim 1, wherein
a groove volume of the shoulder lateral grooves is larger than a groove volume of the middle lateral grooves.

7. The tire according to claim 6, wherein
a maximum value of the angle θ2 of the second side wall surface of each of the shoulder blocks is larger than a maximum value of the angle θ2 of the second side wall surface of each of the middle blocks.

8. The tire according to claim 7, wherein
a maximum value of the angle difference θ2-θ1 of each of the shoulder blocks is larger than a maximum value of the angle difference θ2-θ1 of each of the middle blocks.

9. The tire according to claim 6, wherein
a maximum value of the angle difference θ2-θ1 of each of the shoulder blocks is larger than a maximum value of the angle difference θ2-θ1 of each of the middle blocks.

10. The tire according to claim 1, wherein
a maximum value of the angle θ2 of the second side wall surface of each of the shoulder blocks is larger than a maximum value of the angle θ2 of the second side wall surface of each of the middle blocks.

11. The tire according to claim 7, wherein
a maximum value of the angle difference θ2-θ1 of each of the shoulder blocks is larger than a maximum value of the angle difference θ2-θ1 of each of the middle blocks.

12. The tire according to claim 1, wherein
a maximum value of the angle difference θ2-θ1 of each of the shoulder blocks is larger than a maximum value of the angle difference θ2-θ1 of each of the middle blocks.

13. The tire according to claim 1, wherein
in the shoulder blocks, the angle difference θ2-θ1 becomes maximum in said cross section passing through a position at which the width of the shoulder lateral grooves is maximum.

14. The tire according to claim 1, wherein
the first side wall surface and a groove bottom surface of each of the lateral grooves are connected by a first curved surface, and the second side wall surface and the groove bottom surface of said each of the lateral grooves are connected by a second curved surface, and in said cross section, a radius of curvature R2 of the second curved surface is larger than a radius of curvature R1 of the first curved surface.

15. The tire according to claim 1, wherein
a groove width of each of the first middle lateral grooves increases toward the tire equatorial plane, and
a groove width of each of the second middle lateral grooves is constant along its length direction.

* * * * *